United States Patent
Spada et al.

(10) Patent No.: US 9,973,601 B2
(45) Date of Patent: May 15, 2018

(54) FAULT TOLERANT CLOCK NETWORK

(71) Applicant: AVAGO TECHNOLOGIES GENERAL IP (SINGAPORE) PTE. LTD., Singapore (SG)

(72) Inventors: Eric John Spada, Groton, MA (US); Yongbum Kim, Los Altos Hills, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 231 days.

(21) Appl. No.: 14/198,351

(22) Filed: Mar. 5, 2014

(65) Prior Publication Data
US 2014/0281037 A1 Sep. 18, 2014

Related U.S. Application Data

(60) Provisional application No. 61/791,878, filed on Mar. 15, 2013.

(51) Int. Cl.
*G06F 15/16* (2006.01)
*H04L 29/06* (2006.01)
*H04J 3/06* (2006.01)

(52) U.S. Cl.
CPC ............ *H04L 69/28* (2013.01); *H04J 3/0641* (2013.01); *H04J 3/0667* (2013.01)

(58) Field of Classification Search
CPC ...... H04J 3/0641; H04J 3/0697; H04J 3/0644; H04J 3/0661; H04L 69/28
See application file for complete search history.

(56) References Cited

U.S. PATENT DOCUMENTS 6,169,753 B1 * 1/2001 Yoshida ................ H04J 3/0688
370/507
6,194,969 B1 * 2/2001 Doblar ...................... G06F 1/04
327/292

(Continued)

FOREIGN PATENT DOCUMENTS

CN        1383287 A       12/2002
CN      101547053 A        9/2009

OTHER PUBLICATIONS

Redundancy Experience Used, pp. 1-4, School of Engineering, Zurich University of Applied Sciences, Zurich, Switzerland, Nov. 7, 2011.

(Continued)

*Primary Examiner* — Shean S Tokuta
(74) *Attorney, Agent, or Firm* — Oblon, McClelland, Maier & Neustadt, L.L.P.

(57) ABSTRACT

Fault tolerant and redundant grand master clock scheme may reduce or eliminate precision time transition caused by a network link or device failure. A primary synchronization message may be sent by a primary grandmaster clock and one or more backup synchronization message may be sent by respective backup grandmaster clocks. The primary and backup grandmaster clocks may be concurrently operated. The primary and backup synchronization messages may be sent to an end station over a network. The end station may derive a local clock based on one, some, or all of the received messages. The end station may or may not distinguish between the messages based on the clock source. The end station may validate messages received from a particular clock source.

20 Claims, 7 Drawing Sheets

(56) References Cited

U.S. PATENT DOCUMENTS

| | | | | |
|---|---|---|---|---|
| 8,819,161 B1* | 8/2014 | Pannell | ................ | H04J 3/0697 709/208 |
| 2006/0280182 A1* | 12/2006 | Williams | .............. | H04J 3/0632 370/394 |
| 2008/0168182 A1* | 7/2008 | Frank | ........................ | G06F 1/12 709/248 |
| 2009/0228732 A1* | 9/2009 | Budde | .................... | H04B 7/269 713/400 |
| 2009/0240974 A1* | 9/2009 | Baba | .................. | G06F 11/2028 714/4.1 |
| 2012/0087453 A1* | 4/2012 | Gao | ...................... | H04J 3/0688 375/356 |
| 2013/0132500 A1* | 5/2013 | Vandwalle | .......... | H04L 67/1051 709/208 |
| 2013/0227008 A1* | 8/2013 | Yang | ........................ | G06F 1/12 709/204 |
| 2013/0227172 A1* | 8/2013 | Zheng | .................. | H04J 3/0641 709/248 |
| 2014/0022887 A1* | 1/2014 | Rao | ..................... | G06F 11/2028 370/216 |
| 2014/0140456 A1* | 5/2014 | Tavildar | ................ | H04J 3/0641 375/354 |
| 2014/0198810 A1* | 7/2014 | Jones | .................... | H03L 7/0814 370/507 |
| 2014/0269673 A1* | 9/2014 | Yin | ....................... | H04W 56/00 370/350 |

OTHER PUBLICATIONS

Steiner, W., "Fault-Hypothesis of IEEE 802.1Q AVB and Redundancy Management," pp. 1-7, IEEE Interim Meeting, Santa Cruz, CA, Sep. 2012.

Steiner, W., "Fault-Tolerant Clock Synchronization and thoughts on its use for Improved Grandmaster Changeover Time in IEEE 802.1ASbt," Jan. 12, 2012.

Office Action dated Mar. 15, 2017 in Chinese Patent Application No. 201410096429.5.

* cited by examiner

FAULT TOLERANT CLOCK NETWORK

PRIORITY CLAIM

This application claims priority to U.S. Provisional Application Ser. No. 61/791,878, filed Mar. 15, 2013, which is incorporated herein by reference in its entirety.

TECHNICAL FIELD

This disclosure relates to synchronizing clocks of various nodes located on a distributed network, for example by using redundant grandmaster clocks to protect against faults.

BACKGROUND

Communication protocols are widely used in networks, such as in local area networks (LAN) and metropolitan area networks (MAN). For example, Ethernet, Token Ring, Wireless LAN, Bridging and Virtual Bridged LANs, as specified in the Institute of Electrical and Electronics Engineers (IEEE) 802 standard are some such technologies. The IEEE 802 standards relate to networks carrying variable-size packets. The services and protocols specified in IEEE 802 map to the lower two layers (Data Link and Physical) of the seven-layer open systems interconnection (OSI) networking reference model. The OSI Data Link Layer is split into two sub-layers referred to as Logical Link Control (LLC) and Media Access Control (MAC).

The clocks in devices in a computer network may be synchronized for the devices to work cooperatively. The granularity to which the clocks, or simply the devices, may be synchronized depends on the purpose of the network. Thus, process and motion or other control oriented network applications on mission critical networks, and networks referred to as Time Sensitive Networks (TSN), such as those that may be used in a automotive control systems, such as drive train, traction control system, and in a manufacturing environment, such as high speed motion control, power energy electrical grid control systems, financial transactions network, security networks, and other such networks that support time sensitive applications, depend on a reliable clock source keeping the devices or end stations in the network in-sync. Further, with the progress in mobile networks such as 3G, 4G, 4g LTE, WiFi and various other such networks, synchronization of network connected devices has gained further importance.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to synchronizing clocks of various nodes located on a distributed network.

In this context, a clock may be device with a network connection and may either be the source of (master) or destination for (slave) synchronization reference. A synchronization master may be selected for each network segment in the distributed network. Further, the root timing reference may be referred to as a grandmaster clock. Thus, a grandmaster clock may be the clock that serves as the primary source of time to which all devices in the network are ultimately synchronized. Two or more clocks are generally said to be "synchronized" to a specified uncertainty if they have the same epoch, and measurements of any time interval by both clocks differ by no more than the specified uncertainty. Thus, timestamps generated by two synchronized clocks for the same event may differ by no more than the specified uncertainty. The specified uncertainty provides an engineering tolerance which may vary based on the mission criticality of the network. For example, in a mission critical setting, such as an industrial manufacturing line, the engineering tolerance may be a very small time period, in the range of milliseconds, microseconds, or even smaller. Whereas, in a relatively lax setting, such as an audio-video broadcast, the engineering tolerance of the time period may be a second or longer. The system and method described are not limited by any particular engineering tolerance value.

Redundant grandmaster clocks may be used to protect against synchronizing clock faults in the network. The primary grandmaster clock (pGM) and the backup grandmaster clock (bGM) may be preconfigured or dynamically discovered. The devices selected to be the pGM and bGM may be selected and configured through an election process based on clock quality, priority (preference), and other parameters using election procedures such as the Best Master Clock Algorithm (BMCA) as specified in IEEE 1588-2008 and in IEEE 802.1AS or by using other selection techniques. For example, the clock precedence may be determined based on a source of the clock, such as a GPS or a stratum level of the clock, such as stratum 1 or stratum 2. Traceability of the clock source may also be a factor to determine the clock precedence. For example, if a grandmaster clock device is directly traceable to a clock source such as a GPS, the grandmaster clock device may have a higher precedence than another grandmaster clock device which derives a clock from another device which in turn uses a GPS clock source. The precedence may also be based on a whether a grandmaster clock device is at a relatively central location with respect to the network, whether the grandmaster clock device has a robust power backup and other such network specific details. The relatively central location of the grandmaster clock device, with respect to the network, may be determined based on empirical latency values to transmit messages from the grandmaster clock device to the devices in the network, or any other performance related condition.

In one example, the BMCA may select the pGM and the bGM in advance and the corresponding devices may be identified of their selections as the pGM and bGM respectively, when the devices are deployed in the network. In another example, the devices may be selected as the pGM and bGM after deployment in the network, in which case the BMCA process may be performed dynamically. The BMCA, or any other selection process used may be configured to select more than one bGM device. Thus, an alternate grandmaster device list may be generated by a selection process such that the alternate grandmaster device list contains one or more bGM devices or potential bGM devices. The alternate grandmaster device list may list the potential bGM in order of priority, or clock quality or any other parameter.

A bGM device provides a seamless transition for a network device in the TSN from in case of a failure to receive a primary synchronization signal from the pGM. The failure may be a failure at the pGM or a failure in a link of the TSN. For example, when a pGM fails then a bGM may become the new grandmaster. Therefore, a redundant grandmaster clock system and method is described. It may also be desirable to seamlessly transition the frequency and phase from the pGM to the bGM under failure conditions. For example, switching from the pGM to the bGM (and the bGM to the pGM) may include a controlled phase and frequency deviation. The bGM may be provisioned as active (sending sync) or passive (not sending sync). Redundant grandmaster clocks that are synchronized to each other may also be supported. There may be multiple instances of bGM that are either preconfigured or dynamically discovered and configured through an alternate best master clock selection as a part of the BMCA as specified in IEEE 1588-2008 and in IEEE 802.1AS or through other equivalent dynamic selection means. When multiple bGM are used, the list of bGM is in priority (or preference) order in both provisioned and dynamic selection cases.

Figure 1:
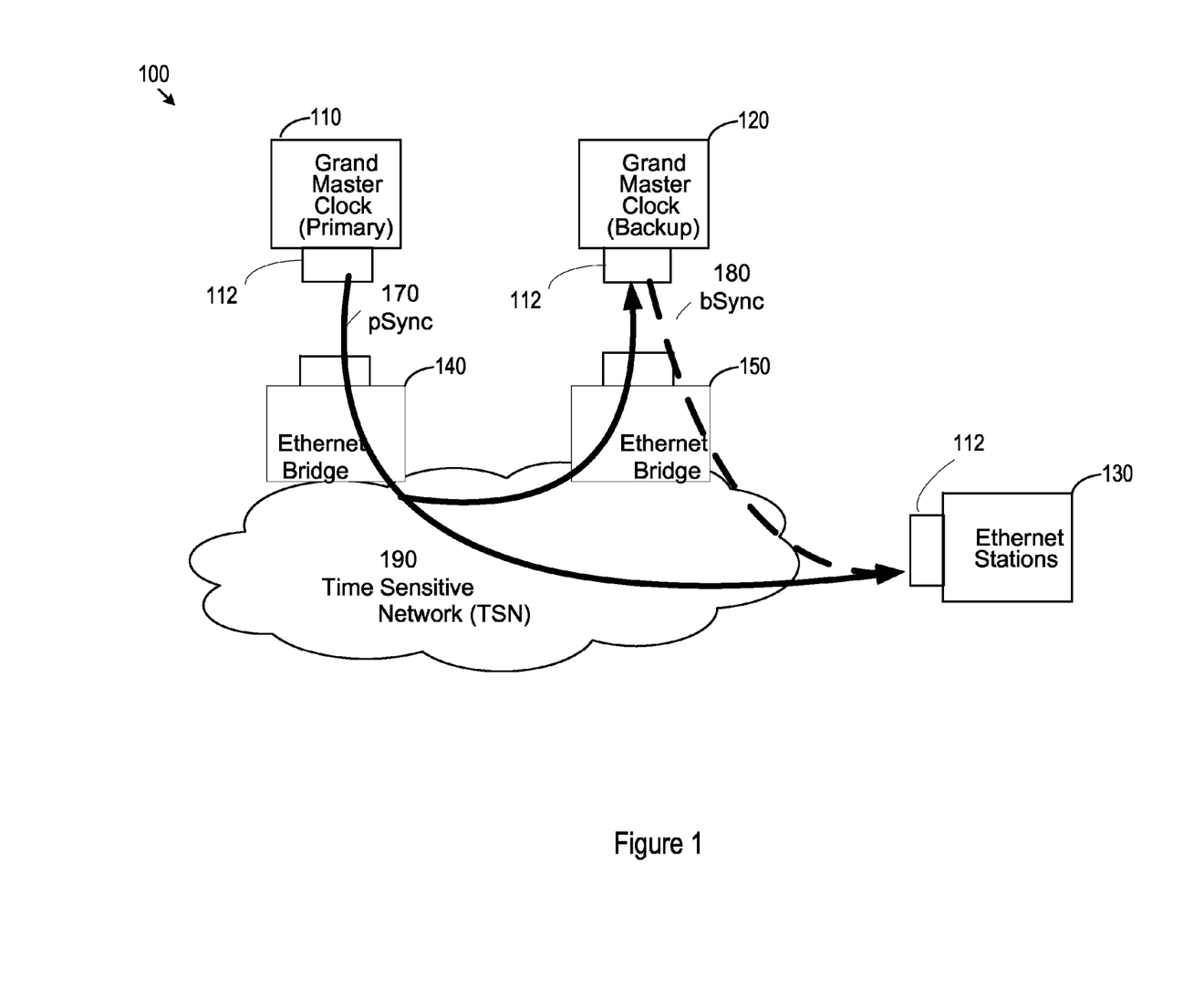
FIG. 1 is a block diagram of an exemplary system utilizing a primary grandmaster clock and a backup grandmaster clock.

FIG. 1 is a block diagram of an exemplary system 100 utilizing a primary clock source including a pGM 110 and a bGM 120. The pGM 110 and the bGM 120 may be selected together using a master clock selection algorithm, such as BMCA or any other algorithm. The bGM 120 may be selected while the pGM 110 is operational and prior to any failure is detected. The pGM 110 and/or the bGM 120 may be provided, for example, with a clock source, such as a global positioning system (GPS), a world time server or any other such clock source. The pGM 110 and bGM 120 may each include an interface 112 to transmit and/or receive messages over the network. In some cases, the pGM 110 and bGM 120 may have separate interfaces to transmit and receive messages. The messages may include a pGM clock synchronization message 170 (pSync 170) and a bGM clock synchronization message 180 (bSync 180). The pSync 170 and bSync 180 messages may both be used to derive a clock for end stations such as Ethernet stations 130. The end stations may also be referred to as end devices, network devices, network nodes, or simply nodes. The end stations may also include interfaces 112 for transmission and receipt of messages over the network. In the system of FIG. 1, the pSync 170 and bSync 180 messages may be sent to and received by the Ethernet stations 130 via Ethernet bridges 140, 150 and Ethernet or other IEEE 802 time sensitive networks (TSN) 190. The pSync message may also be sent to the bGM 120 and the bSync message may be sent to the pGM 110, such as via the Ethernet bridges 140, 150.

The pGM 110 may be a grandmaster clock device selected to be the grandmaster clock of the system 100. The selection may be based on an algorithm such as the Best Master Clock (BMC) algorithm, or any other process. The selection may be based on several factors such as network speed, uptime, variance, assigned priority, or other such factors. The bGM 120 may be a grandmaster clock device selected to be a backup grandmaster clock of the system 100. The bGM selection may be based on the same algorithms and factors as the pGM. Alternatively, the bGM 120 may be selected based on a different algorithm and/or factors. Further, to provide a seamless backup clock signal, the bGM 120 may be selected while pGM is functional. Alternatively, the bGM may be selected after a pGM failure is detected. Although, FIG. 1 illustrates only one bGM, several backup grandmaster clocks may be selected. Thus, at a given time, a pGM and at least one bGM may be functionally active, or operational in the system 100.

The pSync 170 and bSync 180 messages may be configured according to a time protocol such as Network Time Protocol (NTP), Precision Time Protocol (PTP), or other such protocols. Further, the messages may be compliant with protocol standards such as IEEE 1588-2002, IEEE 1588-2008, or any other standard. Messages may be transported via the network 190 using multicast, unicast, or any other communication mechanism or protocol. In addition or alternatively, the messages may be transported using Internet Protocol (IP) packets such as IPv4 or IPv6 packets. Alternatively, or additionally, the messages may be encapsulated using DeviceNet, ControlNet, IEEE 802.3 Ethernet, PTP or any other such protocols.

For purposes of explanation the end stations of FIG. 1 are described as Ethernet stations 130, however the end stations may also include other types of nodes on the network, for example, end stations for Token Ring, Wireless LAN, Bridging and Virtual Bridged LANs type networks. The end stations may be nodes connected to the network such as network bridges, routers, modems, workstations, mobile phones, laptop computers, desktop computers, servers, tablet devices, smartphones, or any other device that may be connected on the network 190. The end stations may also be machinery, such as industrial robots, conveyor belts, or any other such industrial machinery. The end stations may also be vehicles such as cars, trucks, airplanes, space shuttles or other devices which may be synchronized Although, end stations 130 are illustrated as a single block in FIG. 1, it is understood that end stations may include multiple network nodes distributed throughout the network. End stations may be intermediate nodes in the network although, referred to as 'end' stations. The end stations may also be boundary clocks. A boundary clock may typically be used to transfer synchronization from one network segment with a single time domain, such as an internet protocol (IP) subnet, to another, typically through a router that blocks all other synchronization messages. The end stations may include one or more processors and one more non-transitory memory devices. The processors may be responsible for the performing the various functions at an end station. The end stations may also include a local clock that may be synchronized to one or more grandmaster clock devices using the synchronization messages from the grandmaster clock devices. The end stations may be part of a distributed network system and the operations of the end station may be coordinated based on the local clock signals at each respective end station. Therefore, maintaining synchronization of the local clock signals across the end stations may enable the distributed network system, such as system 100, to operate at designated timing intervals and/or events.

As indicated earlier, the bGM 120 may operate in an active or a passive mode. In the active mode, the bGM 120 may continuously send the bSync 180 message over the network, even when the pGM is operational and transmitting the pSync 170 message. Thus, in the active mode, the end stations 130 may receive both, the pSync 170 and the bSync 180 messages. The pSync 170 and bSync 180 messages may be received substantially simultaneously or within a certain time interval of each other. The time interval within which the messages are received may be about half of the time interval between consecutive pSync 170 (or bSync 180) messages. In such a case, if the end stations 130 receive the pSync 170 (or bSync 180) at a frequency F, the end stations 130 may receive the combination of the two messages at twice that frequency, 2F. In the passive mode, the bGM 120 may detect the pSync message and upon failure to detect or receive the pSync 170 message within expected time period, the bGM 120 may send the bSync 180 message. The bGM's timeout period is often shorter than the required hold-over time, where the hold-over time is the time that end stations could continue to operate within specified clock tolerance. The hold-over time is application specific and may be of different value (for example least common denominator) for each time sensitive network. Thus, the Ethernet station 130 may receive only one of the pSync 170 message or the bSync 180 message in the passive mode. However, even in the passive mode, the bGM 120 may be operational and generate the bSync 180 message. In an example, the bGM 180 may transmit the generated bSync 180 message into a temporary buffer, such as a silent drop, instead of the network. Once, the bGM 120 detects a non-receipt of the pSync 170 message, also referred to as a pSync failure, the bGM 120 may change the destination of the generated bSync 180 messages so that the messages are transmitted to the end stations and not the temporary buffer. In cases where there are multiple backup grandmaster clock devices, the Ethernet station 130 may receive multiple bSync messages in case of an interruption in receipt of the pSync 170 message. When multiple bGMs are present, their relative precedence may be known, such as based on the order of the bGMs in the alternate grandmaster device list. Accordingly, the Ethernet station 130 may use the bSync message from the bGM with highest precedence as per the list. Alternatively, the Ethernet station 130 may use all the bSync messages received. Alternatively, or in addition, in case of the multiple bGMs, the bGM 120 may detect bSync messages from the other bGMs in the list. The bGM 120 may compare the precedence assigned to itself and the precedence of the bGM from which another bSync is received. In case the bGM 120 detects that the other bGM is at a higher precedence, the bGM 120 may discontinue transmitting the bSync. Alternatively, or in addition, the bGM 120 may continue transmitting the bSync until detecting the pSync message from the original pGM 110.

In both, the active and the passive modes, the Ethernet stations 130 may use all the synchronization messages received to derive their clocks, irrespective of the source clock of the received synchronization or clock signals. Alternatively, the Ethernet stations 130 may use clock signals received from a particular source clock to derive their clocks. A synchronization messages may contain an identifier that indicates the source of the message. The identifier may be a global identifier that is included in a synchronization message regardless of the source. In such cases, the end stations 130 may not distinguish between the received synchronization messages. The bGM 120 may extract the global identifier from the pSync 170 message and embed, or include it in the bSync 180 message generated by the bGM 120. The bGM 120 may store the global identifier for the embedding. Alternatively, or in addition, a synchronization message may contain a unique identifier of the grandmaster clock device that generated the message. Thus, the bGM 120 may, in addition to the global identifier, embed a identifier representative of the bGM 120 in the bSync 120 message. In another example, the bGM 120 may only add the unique identifier and not the global identifier to the bSync 180 message. The unique identifier may enable the end stations 130 to identify the source of a received synchronization message and perform analysis of the reliability of the source grandmaster clock device, such as the reliability of the source device. The end station behavior may remain the same even though the rate of synchronization may change. For example, in the active mode, the Ethernet station 130, may receive multiple synchronization messages, such as the pSync 170 and bSync 180 messages. The synchronization messages from multiple sources may be received within a predetermined time interval from each other. Alternatively, the synchronization messages may be received substantially simultaneously. Alternatively, or in addition, the synchronization messages may be received at a particular rate. The Ethernet station 130 may derive the local clock based on all the received synchronization messages. In the passive mode, the Ethernet station 130 may receive only a pSync 170 or a bSync 180 message at a given time. In such a case, the Ethernet station 130 may derive the clock based only on the received pSync 170 or bSync 180 message. Thus, regardless of the frequency at which the synchronization messages are received the Ethernet station 130 may continue to synchronously operate, in either of these cases.

Figure 2:
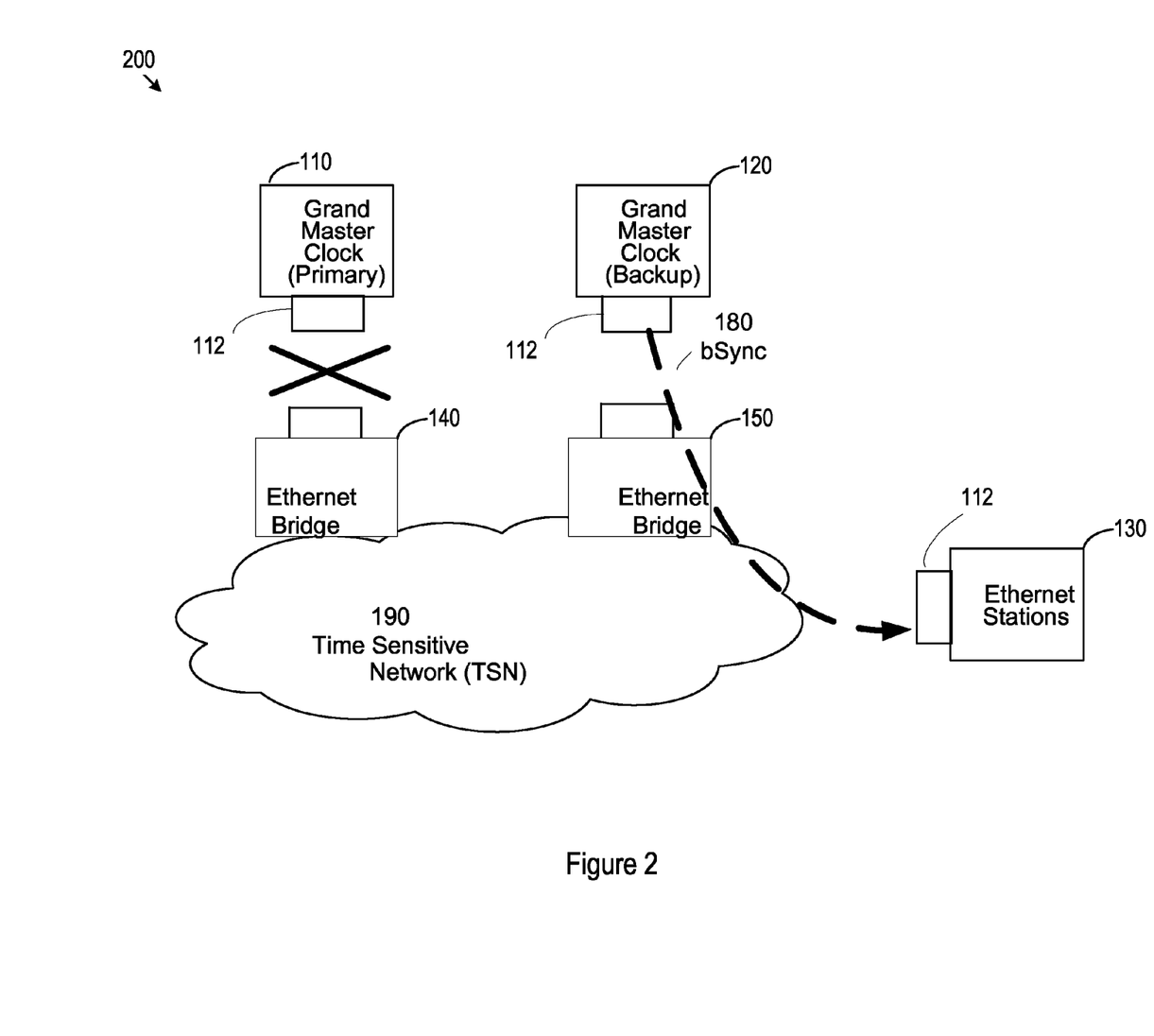
FIG. 2 is a block diagram of another exemplary system utilizing a primary grandmaster clock and a backup grandmaster clock.

FIG. 2 is a block diagram of an exemplary system 200 in which the pGM 110 failed to send accurate pSync 170 messages. The bGM 120, operating in an active mode, may continue to send bSync 180 messages to the Ethernet station 130. As described elsewhere, the Ethernet station 130 may continue to operate seamlessly as based on the continuously received bSync 180 messages as the Ethernet station 130 may derive the clock based on the bSync 180 message.

Alternatively, if the bGM 120 is operating in a passive mode, the bSync 180 message is not being continuously transmitted. In this case, as described elsewhere, the bGM 120 may wait for a predetermined timeout, or a holdover time before transmitting the bSync 180 message. Holdover time is the time period used to keep a device sync-stabilized when the source of a device's sync is disrupted or temporarily unavailable. The holdover time after which the bGM 120 sends the bSync 180 message may be shorter than a holdover time used by the Ethernet station 130. For example, the holdover time of the bGM 120 may be a number of milliseconds while the holdover time of the Ethernet stations 130 may be a second. Thus, the Ethernet station 130 may receive the bSync 180 message within the holdover time of the Ethernet station 130. Consequently, the Ethernet station 130 may continue to seamlessly derive the clock from the bSync 180 message (instead of the pSync 170 message) and continue synchronized operation. Therefore, the Ethernet stations 130 may seamlessly continue to synchronize their clocks even during a pGM fault or other condition in which the pSync 170 message is not received. Alternatively, during the passive mode, the Ethernet stations 130 may enter holdover until being synchronized to bGM 120 using the bSync 180 message.

Figure 3A:
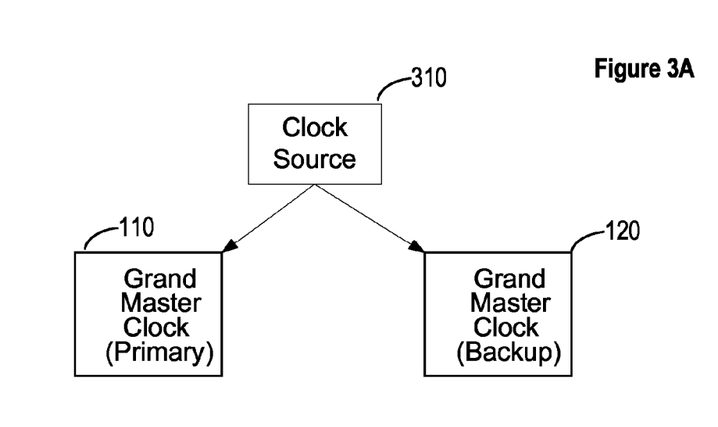
FIGS. 3A and 3B are block diagrams of example configurations of a primary grandmaster clock and a backup grandmaster clock operating with a common or separate clock sources.
Figure 3B:
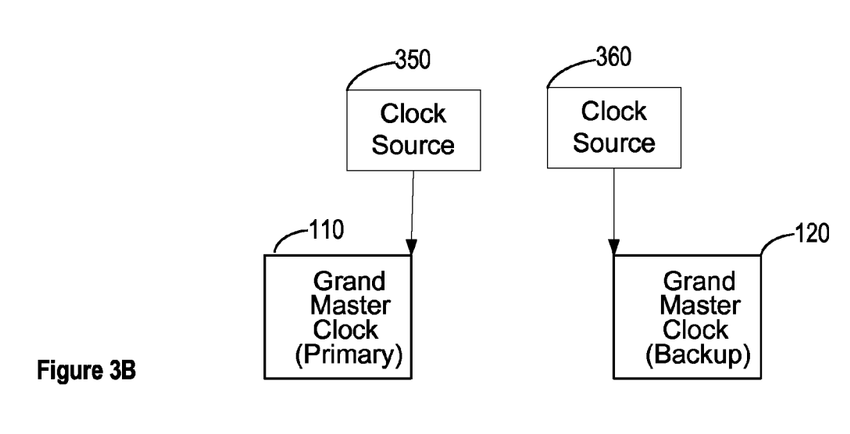

The pGM 110 and bGM 120 may derive their respective clock signals to provide the pSync 170 and bSync 180 messages from a traceable clock source. For example as shown in FIG. 3A, pGM 110 and bGM 120 may use a common clock source 310. Alternatively, as shown in FIG. 3B, pGM 110 and bGM 120 may each have independent clock sources 350 and 360 respectively. Each of the clock sources 310, 350, and 360 may be a GPS, an ordinary clock, or any other clock signal providing device. A clock source may be external to a grandmaster clock device and the grandmaster clock device may derive a local clock to the clock source. Alternatively, or in addition, a grandmaster clock device may include an internal clock source. The clock sources may be used by the pGM 110 and/or bGM 120 to establish a Coordinated Universal Time (UTC) time base. The clock source 350 used by the pGM 110 may be a preferred clock reference while the clock source 360 used by the bGM 120 may be an ordinary clock or a non-common clock source.

In the initial case, where both pGM 110 and bGM 120 have the traceable common clock source 310, the pSync 170 and bSync 180 messages may be providing clock signals within a desired and/or predetermined tolerance. The tolerance may also be referred to as an engineering tolerance, and is a permissible limit of variation in the clock signal. Tolerances are, typically, specified to allow reasonable leeway for imperfections and inherent variability without compromising performance and without significantly affecting functioning of the overall system and/or individual devices. The tolerance may be based on jitter-wander tolerance as per a Maximum Time Interval Error (MTIE) mask for the system. Therefore, the clocks being derived based on the pSync 170 and/or bSync 180 messages, such as the clocks at the end stations may be operating substantially synchronously within the predetermined tolerance.

Figure 4:
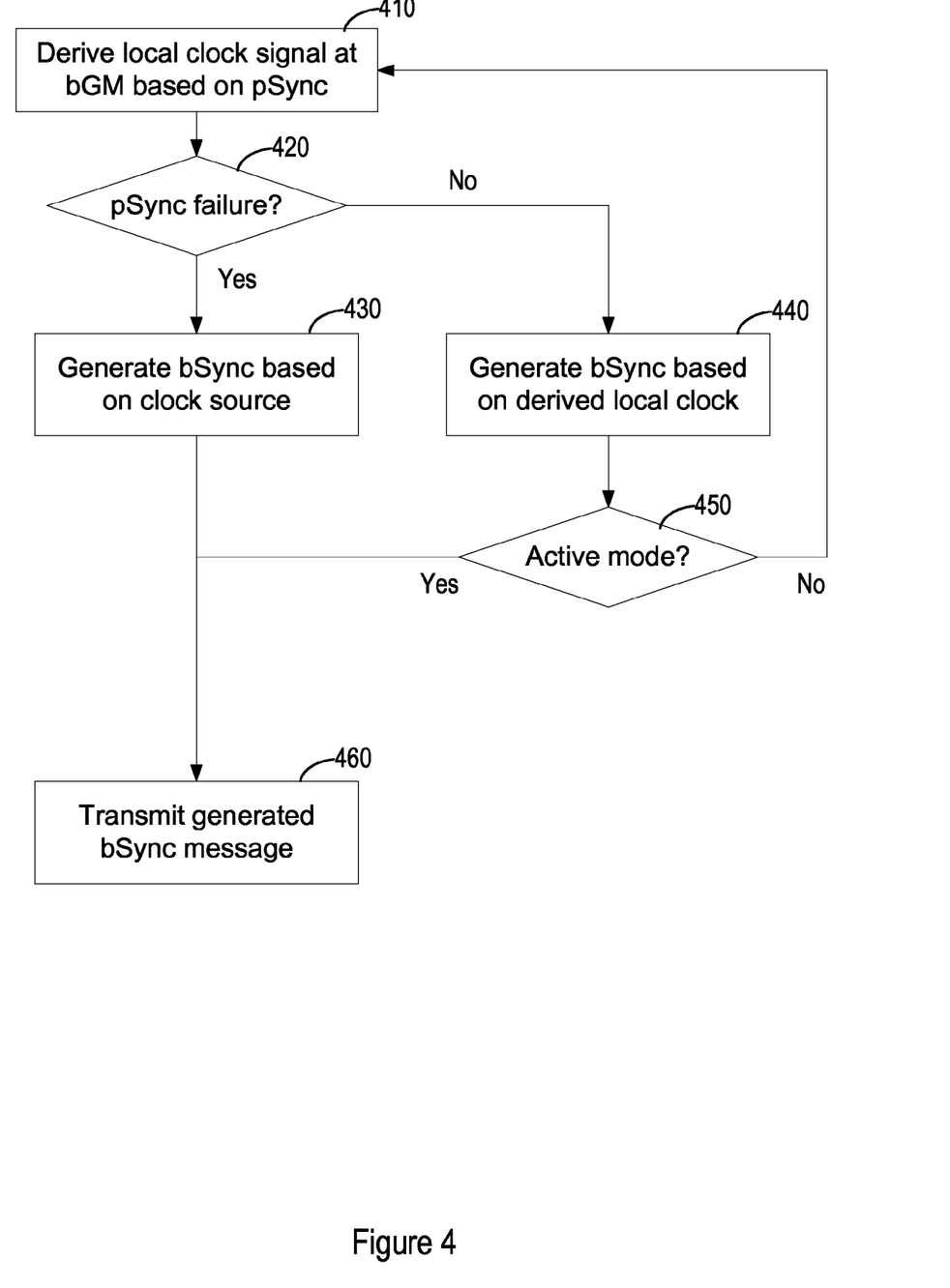
FIG. 4 is a flowchart illustrating example steps performed by an example backup grandmaster clock.

In the case, where the pGM 110 uses a first clock source, such as the clock source 350 and the bGM 120 uses a second clock source, such as the clock source 360, extra steps may be taken to maintain synchronization when the two clock sources are separate autonomous clock sources. For example, one of the grandmaster clock devices may derive a clock based on the other grandmaster clock device. FIG. 4 illustrates at least some example steps that may be taken in this regard. In this example, at step 410, the bGM 120 may derive a local clock signal based on the pSync 170 messages. This may involve syntonizing a local clock at the bGM 120 with the clock signal provided by the pSync 170 messages. As long as a pSync failure is not detected at step 420, the bGM 120 may generate the bSync 180 message based on the derived local clock signal. Further, if the bGM 120 is operating in an active mode, which may be determined in step 450, the generated bSync 180 message may be transmitted over the network 190 in step 460. Instead, if the bGM 120 is not operating in the active mode at step 450, the operation may return to block 410. Alternatively, if a pSync failure is detected at step 420, such as the pSync 170 message is not received for more than the holdover time, the bGM 120 may generate the bSync 180 message based on the clock source 360 (instead of the derived local clock). However, shifting the clock source from the pGM 110 to the clock source 360 may cause an abrupt change which may be above the predetermined tolerance discussed earlier. Therefore, the bGM 120, may migrate the local clock from the pGM 110 to the clock source 360 in small steps. Each step of the migration of the local clock may be performed within the allowed predetermined tolerance until the local clock is substantially synchronous with the clock source 360. Since, a pSync failure was detected, in both, the active mode or the passive mode, the bGM 120 may transmit the generated bSync 180 message over the network as in step 460.

Figure 5:
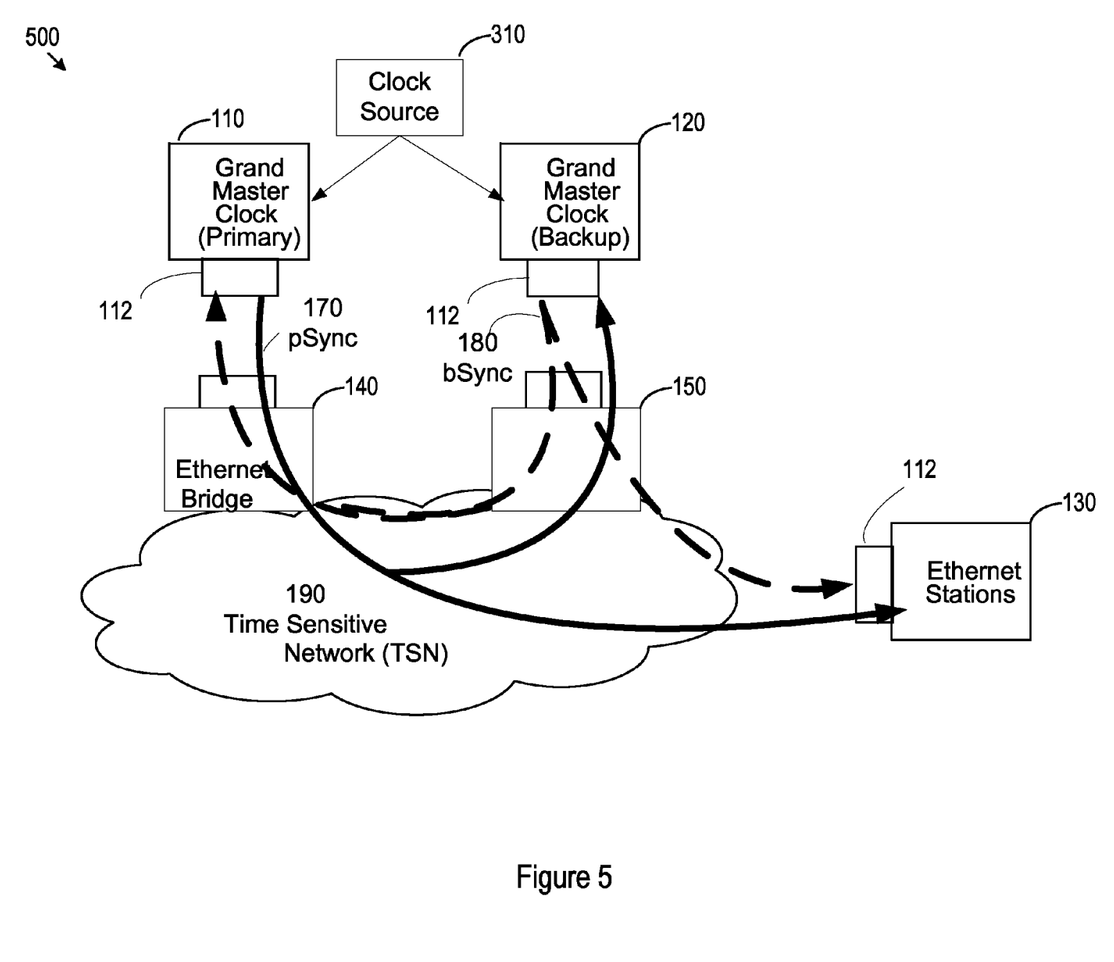
FIG. 5 is a block diagram of an exemplary system for healing primary grandmaster primary synchronization message in which the primary grandmaster clock and the backup grandmaster clock share a common primary clock source.

FIG. 5 is a block diagram of an exemplary system 500 for recovering, or healing, the pGM pSync 170 messages in which the pGM 110 and the bGM 120 share a common clock source, such as a GPS clock source. As described earlier, in case of a failure to receive the pGM pSync 170 messages the bGM 120 may have taken the role of the primary grandmaster clock device of the system and may be responsible for the synchronization messages to the end stations 130 in the system. Once the failure related to the pSync 170 messages is resolved, the system such as the stem 500, may transition back to the earlier state with pGM 110 as the primary grandmaster clock device and the bGM 120 as the backup grandmaster clock device. The failure may have been caused by a failure at the pGM 110, or a failure in the communication channel being used for the transportation of the pGM pSync 170 messages, or other such failures at any component in the system. Upon recovery from such a failure, the pGM 110 may not start sending the pSync 170 messages right away. Instead, the pGM 110 may check synchronization to bGM 120 before beginning to send the pSync 170 messages again. This may be done because the clock signal of the bGM 120 may have drifted away from the clock signal of the pGM 110, for example if the bGM 120 migrated to a different clock source as was described earlier. In such a case, the bGM 120 may send the bSync 180 messages to the pGM 110. The pGM 110 may check for synchronization to bGM 120 based on the bSync 180 messages. The pGM 110 may syntonize the local clock signal at the pGM 110 to the clock information contained in the bSync 180 messages. Once the pGM 110 has derived a stable clock based on the bSync 180 messages, the pGM 110 may generate the pSync 170 messages based on the local clock and transmit the pSync 170 messages. The bGM 120 in the active mode may continue to transmit the bSync 180 messages as before. The bGM 120 in the passive mode may detect that the pGM 110 has resumed sending pSync 170 messages, and may continue to send bSync 180 messages for the holdover period of time. After the holdover period, the bGM 120 may stop sending the bSync 180 messages.

Alternatively, the bGM 120 may not have drifted away from the pGM 110 during the time the pSync 170 messages were interrupted by failure. This may be the case if the pGM 110 and the bGM 120 clock sources are traceable to the same clock source 310, and/or if the pSync failure was for a negligibly small period of time. In such cases, the pGM 110 may not syntonize to the bGM 120 during the recovery. The recovery from the failure may also be referred to as healing or heal-back. Further, the bGM 120 may not syntonize to the pGM 110 once the pGM has recovered, or healed-back and starts sending pSync 170 messages. The Ethernet stations 130 may use both the bSync 170 and the pSync 180 to derive their clocks.

Figure 6:
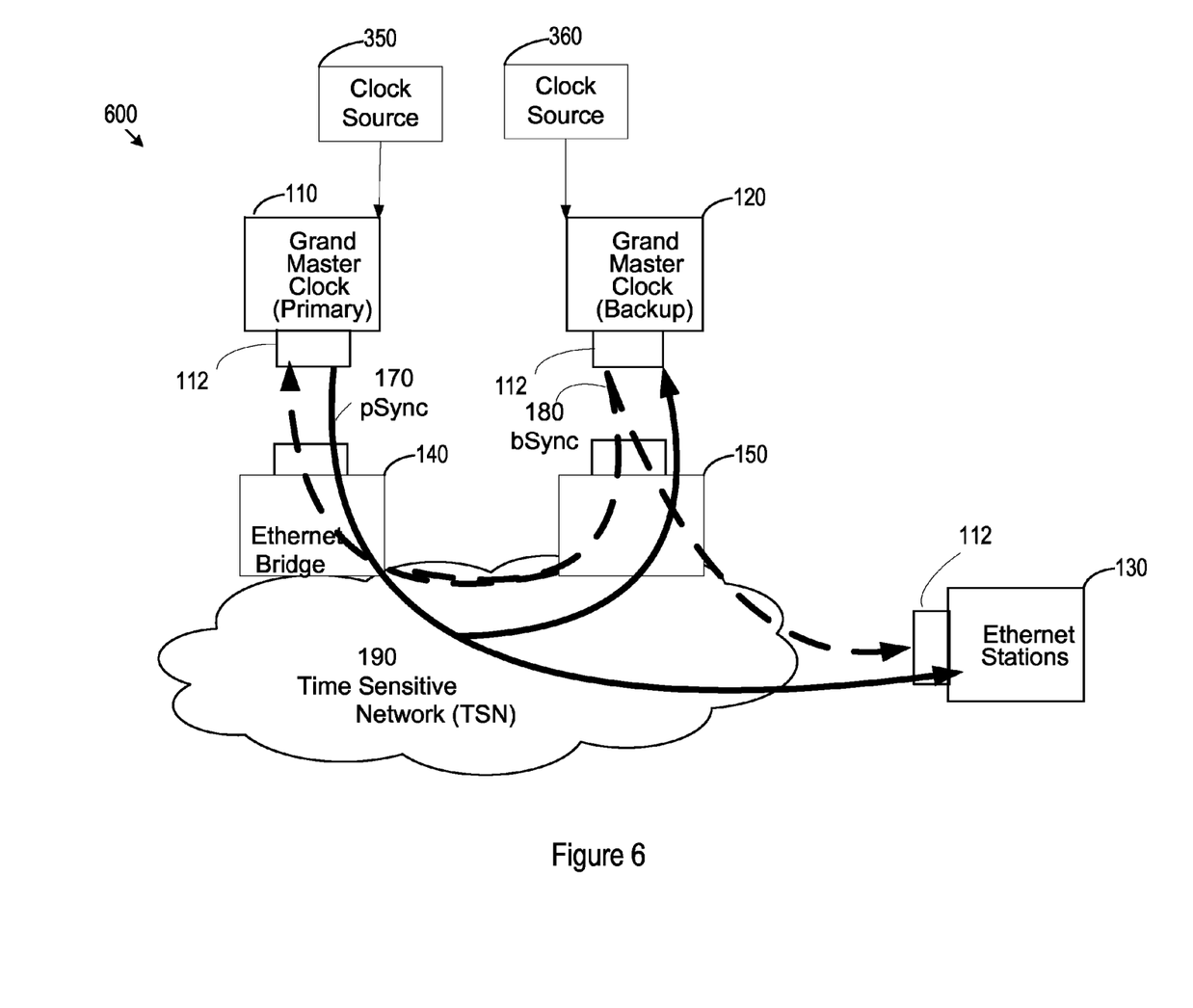
FIG. 6 is a block diagram of an exemplary system for healing the primary grandmaster clock primary synchronization message in which the primary grandmaster clock and the backup grandmaster clock do not share a primary clock source.
Figure 7:
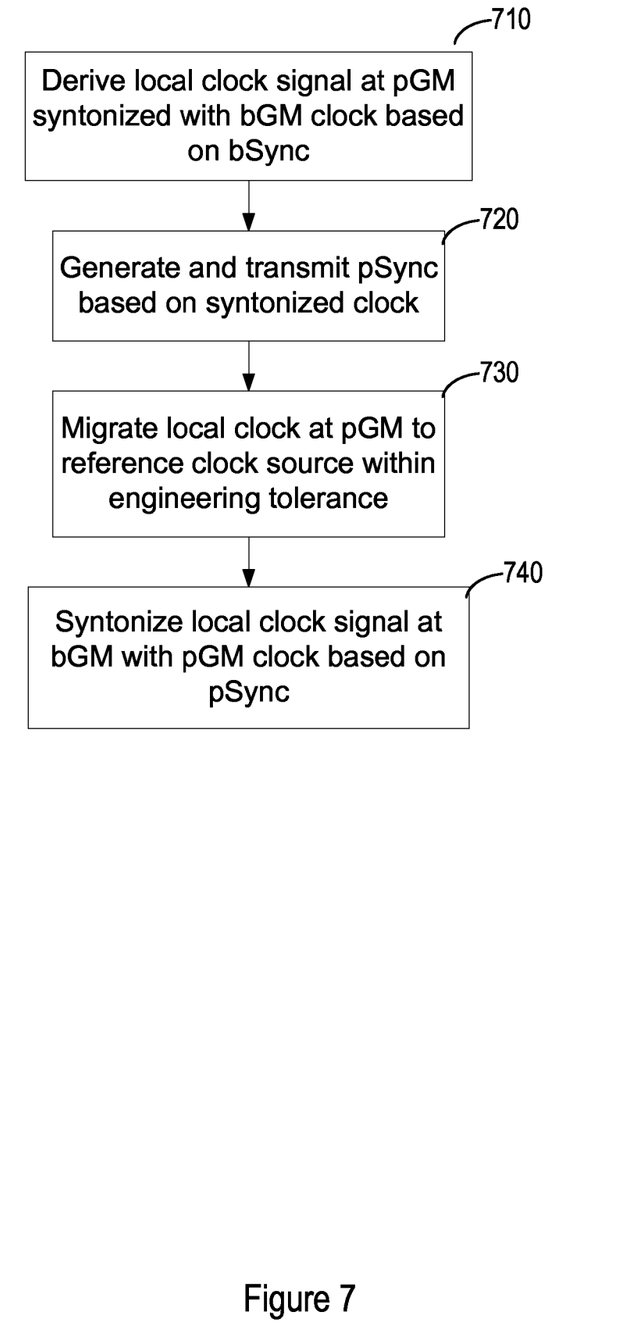
FIG. 7 is a flowchart illustrating example steps performed during healing the primary grandmaster clock primary synchronization message in which the primary grandmaster clock and the backup grandmaster clock do not share a primary clock source.

FIG. 6 is a block diagram of an exemplary system 600 illustrating recovery from a pSync related failure and where the pGM 110 and the bGM 120 of the system 600 do not share a primary clock source, or have separate clock sources 350 and 360 respectively. In conjunction, FIG. 7 illustrates example steps that may be performed during and after the recovery from a failure in such a case. When the pGM 110 and bGM 120 clock sources are not traceable to the same clock source as in system 600, the bGM 120 may drift in frequency and/or phase relative to the pGM 110 once the bGM 120 stops receiving pSync 170 messages. Hence, in step 710, the pGM 110 may syntonize to the bGM 120 upon recovery. Since the end stations 130 may be using both the pSync 170 and bSync 180 for local synchronization, the respective clock signals of pSync 170 and bSync 180 may be maintained within the predetermined tolerance. To maintain the tolerance, the pGM 110 may syntonize the local clock at the pGM 110 using the clock information in the bSync 180 messages from the bGM 120. Once the syntonization is complete, timing corrections may be made using a timing procedure, such as MTIE to maintain the desired engineering tolerance. The pGM 110, in step 720, upon achieving a stable lock, may generate and send pSync 170 messages based on the syntonized local clock. In step 730, the pGM 110 may further move the syntonized local clock to the primary reference clock source 350 by allowed jitter-wander tolerance per the a timing procedure, such as MTIE. After detecting pSync, the bGM 120, in step 740, may, in turn, syntonize its local clock with the clock of the pGM 110 using the pSync 170 messages. Typically, the syntonization may be performed by transitioning the clock within a jitter-wander tolerance of the pGM 110, as described elsewhere in this document. If the bGM 120 is operating in the active mode, the bGM 120 may send the bSync 180 message continuously. In the passive mode, the bGM 120 may send the bSync 180 message for a holdover period after detecting pSync 170 message after the recovery, and after the holdover period ends, stop sending the bSync 180 message.

Therefore, in general with the simultaneously operating, redundant grandmaster clocks, when the pGM 110 and the bGM 120 have the same primary clock source 310, the respective clocks at the pGM 110 and the bGM 120 may be synchronized and extra steps may not be taken for synchronization of the clocks. Alternatively, if the pGM 110 and the bGM 120 have different primary clock sources 350 and 360 respectively, the bGM 120 may initially be syntonized to the pGM 110. For example, the local clock of the bGM 120 may be adjusted to operate on the same frequency and phase as the local clock of the pGM 110. This may involve processing the clock information contained in the pSync 170 messages. The bGM syntonized clock may be used when it is stabilized within the clock tolerances as needed per MTIE.

Failure detection by bGM 120 may be similar regardless of whether the pGM 110 and bGM 120 use a common clock source, or different clock sources. End stations, such as Ethernet Stations 130 may receive pSync 170 and bSync 180 messages from both the pGM 110 and bGM 120 at nominally twice the rate as with a single grand master. These messages may appear identical from a synchronization perspective even though a clock ID included in the messages may identify one of two different sources of the messages.

The bGM 120 may operate either in an active mode or a passive mode. In the active mode, the bGM 120 may generate and transmit a bSync message regardless of whether the pSync 170 message is being transmitted or not. Thus, during a pSync failure, such as a pGM failure, an active bGM 120, may continue to send bSync 180 messages to all end stations or nodes in the network. The end stations may receive the bSync 180 messages and derive and/or adjust their respective clocks according to the bSync 180 messages. During operation when the pSync 170 message is operational, end stations 130 may receive pSync 170 and bSync 180 from the pGM 110 and bGM 120 respectively, at twice the rate as with a single GM. These messages may appear identical from a synchronization perspective even though the clock IDs may be different in different received messages. The end stations may process the messages as if they were from the same GM since they are synchronized. Thus, in the case of the active mode bGM 120, the end stations may continue to operate seamlessly with or without an operational pSync 170 message, such as when pGM 110 may be out of operation.

In the passive mode, the bGM 120 may not send the bSync 180 messages when the pGM 110 is operational. During a pGM failure operation using passive bGM 120, the bGM 120 may start sending bSync 180 messages after a timeout of pGM 110. The timeout period for which the bGM 120 waits for a pSync 170 message may be shorter than a holdover period configured at the end stations. After the timeout period, the bGM 120 may start sending the bSync 180 messages to the end stations. The end stations may operate in holdover until bGM synchronization is achieved using the bSync 180 messages. Thus, in the case of the passive mode bGM 120, the end stations continue to operate seamlessly with or without an operation pGM 110.

Upon detection of the pSync failure, such as a failure at the pGM 110 or a network link, the bGM 120 assumes the role of the current pGM. In addition, a new backup grandmaster clock device may be selected by triggering a bGM selection, such as a BMCA, in response to detection of the failure and transition to the bGM 120. The new bGM may be added to the alternate grandmaster device list. In case the list is ordered according to the relative precedence of the bGMs, the newly selected bGM may be either appended to the list or may be inserted at an earlier spot in the list. The selection may be performed based on a master clock selection algorithm such as the BMCA. Other algorithms may also be used for the selection. The clock selection algorithm, such as the BMCA, may be unmodified in case the possible new backup grandmaster clock devices have clock sources within the predetermined tolerance with respect to the bGM 120. Further, the clock selection may not be performed in case a secondary backup grandmaster clock device has already been selected previously, or if there are multiple grandmaster clock devices actively transmitting respective synchronization message across the network.

The pGM 110 and bGM 120 may operate in a network that supports dual or multiple time sensitive applications. In such cases, the network may support more than one independent time domains that are independent from each other. For example, a first application in the network may depend on precision time of the day clock that may be derived from a GPS clock, where leap-seconds (or leap microseconds) corrections are desirable or essential for functioning of the first application. Concurrently, a second application that is operational on the network may depend on precision repeating cycles where leap-second corrections may be non-essential, or even undesirable. Therefore, the two applications may be part of independent time domains and may derive the corresponding clocks from independent clock sources. Each independent time domain may include a respective pGM and bGM devices as described throughout this document. Thus, for each independent time domain support in the network, respective pGM and bGM devices may be duplicated to achieve fault tolerance. Dual time domains could be extended to cover overlapping pSync and bSync timing paths.

For simultaneous, redundant GM recovery, the failure may be fixed and the original pGM 110 restored or a new pGM 110 may be inserted into the network. Due to the failure of the pSync 170 messages, such as due to failure of pGM 110, the bGM 120 may take over responsibility of the pGM and thus may be considered the current pGM. The current pGM (original bGM 120) may have drifted away from the original pGM's 110 clock reference. During recovery of the pSync 170, to maintain synchronization between the GM clock sources, the pGM 110 may be first synchronized to the current pGM (original bGM 120). Once synchronized, the original pGM 110 may be reinstated as the pGM and may start sending pSync 170 messages. The pGM 110 may stabilize the clock after synchronization before sending the pSync 170 messages. The original bGM 120 (current pGM), upon detecting the recovered pSync 170 messages, may reinstate itself as the backup GM and may syntonize its clock to the pGM 110 using the pSync 170 messages. The bGM 120 may optionally stop sending the bSync 180 messages while the changeover occurs. In this optional case, the bGM 120 may go into an initiation stage with respect to the newly found and/or recovered pGM. In the passive mode, the bGM 120 may stop sending bSync 180 after pGM detection and a predetermined timeout. The pGM 110 may move the synchronized clock to a reference clock source as discussed elsewhere in this disclosure. The pGM 110 may transition the clock to the primary reference by applying the time difference gradually to avoid non-continuous steps in the synchronized time. The transition, may therefore, be performed by small steps, such as within the predetermined tolerance. The predetermined tolerance may be based on jitter-wander tolerance of the system. The predetermined tolerance may be limited by the MTIE of the system.

Alternatively, upon recovery from the pSync failure, the current pGM (original bGM 120) may continue to operate as the pGM. The original pGM 110 may take over as the current bGM upon recovery from the pSync failure. The current bGM (original pGM 110) may be syntonized with the current pGM (original bGM 120) upon recovery as discussed earlier. The current bGM (original pGM 110), in the active mode, may send the bSync 180 message in conjunction with the pSync 170 message from the current pGM (original bGM 120). Alternatively, in the passive mode, the current bGM (original pGM 110) may send the bSync 180 message in case the pSync 170 message from the current pGM (original bGM 120) is not received for the holdover time. The change in roles among the pGM and bGM may not affect the synchronization of the respective local clocks at the end stations 130. The end stations 130 may continue to derive their respective local clocks based on the received synchronization messages from the current primary and backup grandmaster clock devices.

Operation of an end station as, for example, an Ethernet Station or other IEEE 802.1AS and IEEE 1588 capable network nodes, may include operation during entry into a holdover period when no synchronization message is received. The holdover period may take clock tolerance values, such as the predetermined tolerance, into account when free-running, such as when no synchronization message is received within an expected period. An end station may not distinguish pSync from bSync, and one or both pSync and bSync may be used for synchronization and/or syntonization to derive a local clock. For reliability and protection, three or more synchronization messages may be received at the end stations from three or more grandmaster clocks. A weighted selection, such as simple majority, weighted majority, or other calculation may be performed to qualify a synchronization message before being used. For reliability and protection, each of the synchronization messages may be validated. Validating the synchronization message, and thereby a clock signal from a particular grandmaster clock source may be based on a time-value difference between successive messages of the clock signal from the particular grandmaster clock source. The time-value difference between a current synchronization message and a previous synchronization message from the particular source may be determined. The end station may then ensure that the time-value difference is within an expected predetermined range. Such a validation check may be performed before the synchronization messages from the particular source are used. If an out-of range time-value step is detected over a determined and/or configurable time or sequence, the particular grandmaster clock may be deemed an unreliable, or invalid, clock source and this status may be signaled to a network management entity, such as a network manager. The network management entity may be an automated system, or a network administrator responsible for maintaining the network in an operative state. Alternatively, or in addition, an unreliable status of the particular grandmaster clock may be reported to a common repository that may receive status updates regarding the network components. Such status updates may be represented in a visual depiction of the system. The end station may use the clock ID included in the messages to determine the source of the message and thereby the clock source of the clock signal received.

The operations described herein may also be used to migrate the synchronized network from one time domain under a pGM to another time domain under different pGM'. A time domain may be a logical grouping of clocks that synchronize to each other, generally using a protocol, such as one of the PTP protocols mentioned earlier. The clocks in one time domain may not necessarily be synchronized to clocks in another time domain. Time domains provide a way of implementing disjoint sets of clocks, sharing a common network, but maintaining independent synchronization within each set. Using the operations described, a time domain may be migrated from a pGM to another pGM'. The previous time domain pGM may then be retired. For example, synchronization messages from pGM' including a time domain different than a time domain of the pGM may be sent to the end stations. Synchronization of a clock of the end station may then be migrated from the pGM to the synchronization message from pGM' from another time domain. The migration may be performed by applying the time difference between pGM and pGM' gradually to avoid non-continuous steps in the synchronized time. As the migration proceeds closer to the time domain of PGM', pGM may be retired The end stations may receive and handle a plurality of synchronization messages from multiple different time domains. The multiple time domains may be overlapping in a single network, and synchronization messages pSync, bSync, and other messages may be carried over any fault tolerant network paths. The network paths may include Ethernet, wireless local area networks, coaxial and power lines. End stations may also perform grandmaster validation functions based on synchronization messages received from a particular grandmaster clock device. The time-value difference between successive messages or messages over a particular time period may be used for this purpose. The end station may employ algorithms such as N−1 out of N agreement, weighted differences, or any other such algorithms to determine reliability of the timing information received from the particular grandmaster clock device.

The methods and devices described above are applicable to any time-aware systems and networks such as Ethernet, Coordinated Shared Networks (CSN), such as WLAN Coax, powerline, and other such time-aware networks. The grandmaster clock devices may be devices specifically configured to provide the clock synchronization messages described throughout this disclosure. The grandmaster clock devices described may include one or more processors and one or more non-transitory memory devices. The processors may be responsible for performing the various functions described throughout this disclosure. The grandmaster clock devices may also include network interfaces and corresponding logic and circuitry to transmit and receive messages over various communication networks such as those described throughout this disclosure. The grandmaster clock devices may further include a local clock that may be synchronized to other clocks. In addition, or alternatively, the grandmaster clock may receive a reference clock signal from devices such as a GPS.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A device, comprising:
   a clock operable as a backup grandmaster clock due to the device being selected from a list of grandmaster clock devices throughout a network, the list of grandmaster clock devices being organized in order of priority based on at least clock traceability and device location within the network;
   an interface configured to communicate on the network, and receive a primary synchronization message, the primary synchronization message received continuously over the network from another device selected from the list of grandmaster clock devices to be a primary grandmaster clock device and identified to the device and the other devices throughout the network as the primary grandmaster clock device, and the primary synchronization message comprising a clock signal of the primary grandmaster clock device;
   a processor configured to maintain the backup grandmaster clock substantially synchronous with the clock signal received in the primary synchronization message; and
   the processor further configured, while receiving a primary synchronization message, to generate a backup synchronization message based on the backup grandmaster clock, as a redundant message to the primary synchronization message presently being received, the backup synchronization message comprising a clock signal of the backup grandmaster clock, and the interface further configured to transmit the generated backup synchronization message over the network for receipt by all other devices as a duplicative clock signal, wherein the backup synchronization message is received substantially simultaneously with the primary synchronization message or within a predetermined time interval of the primary synchronization message.

2. The device of claim 1, wherein the interface configured to redundantly transmit the generated backup synchronization message over the network in an active mode, and in a passive mode, the interface configured to transmit the backup synchronization message to a temporary buffer in response to receipt of the primary synchronization message.

3. The device of claim 2, wherein, in the passive mode, the processor is configured to:
   detect an absence of receipt of the primary synchronization message from the primary grandmaster clock device for a predetermined holdover time; and, in response,
   trigger retrieval of the backup synchronization message and transmission of the backup synchronization message for receipt by the other network devices throughout the network.

4. The device of claim 3, wherein the predetermined holdover time after which transmission of the backup synchronization message to the other network devices throughout the network is triggered is shorter than a predetermined holdover time of the other network devices throughout the network.

5. The device of claim 3, wherein, the processor is configured to detect receipt of the primary synchronization message from the primary grandmaster clock device after the predetermined holdover time, and, in response, discontinue the transmission of the backup synchronization message for receipt by the other network devices throughout the network.

6. The device of claim 3, wherein, in response to the absence of receipt of the primary synchronization message from the primary grandmaster clock device, the processor is configured to initiate the backup grandmaster clock device as a new primary grandmaster clock device of the network and the primary grandmaster clock device as a new backup grandmaster clock device of the network.

7. The device of claim 1, wherein the backup synchronization message is transmitted for receipt by the other network devices throughout the network regardless of the receipt of the primary synchronization message.

8. The device of claim 1, wherein the processor is further configured to:
    extract a global identifier from the received primary synchronization message; and
    include the global identifier in the generated backup synchronization message prior to transmission of the backup synchronization message.

9. The device of claim 8, wherein the processor is further configured to include an identifier representative of the primary grandmaster clock device in the generated backup synchronization message prior to transmission of the backup synchronization message.

10. A device comprising:
    a clock;
    an interface configured to continuously receive a first clock signal over a network from a first device selected from a list of grandmaster clock devices as a first grandmaster clock device and identified to the device as the first grandmaster clock device, the first grandmaster clock device operable as a primary source of time for all devices in the network;
    the interface further configured to consecutively receive a second clock signal, as a duplicative clock signal, substantially simultaneously with receipt of the first clock signal or within a predetermined time interval of receipt of the first clock signal, the second clock signal received over the network from a second device selected from the list of grandmaster clock devices, the second grandmaster clock device being a redundant grandmaster clock device to the first grandmaster clock device and redundantly operable as another primary source of time for all the devices in the network, the list of grandmaster clock devices being organized in order of priority based on at least clock traceability and device location within the network; and
    a processor configured to operate the device as an end station device, the processor further configured to adjust the clock based on the received first clock signal and the received second clock signal.

11. The device of claim 10, wherein the processor is configured to adjust the clock at the first frequency, wherein the first frequency being a rate at which the first clock signal and the second clock signal are received.

12. The device of claim 11, wherein the processor is configured to adjust the clock at a second frequency, wherein the second frequency is a rate at which the second clock signal is received.

13. The device of claim 10, wherein the interface is configured to receive a third clock signal from a third device identified to the device as a third grandmaster clock device redundantly operable as another primary source of time for all the devices in the network, and wherein the processor is configured to adjust the clock based on the first, second and third received clock signals irrespective of a source of the received clock signals.

14. The device of claim 10, wherein,
    the processor is configured to identify a source of a received clock signal based on an identifier, representative of an identity of the source, in the clock signal, and
    the processor is further configured to validate the clock signal from the source based on a time-value difference between successive messages of the clock signal from the source.

15. The device of claim 14, wherein,
    the processor is configured to indicate, via a message transmitted over the network to a network manager, the source as an unreliable source of the clock signal based on the time-value difference being outside a predetermined range.

16. A method, comprising:
    receiving continuously at a time interval, at a network device, from over a network, a primary synchronization message, the primary synchronization message received from a first device selected from a list of grandmaster clock devices as a primary grandmaster clock device and identified to the network device as the primary grandmaster clock device, the first device being operable as a primary source of time for all devices in the network;
    receiving, as a duplicative clock signal, substantially simultaneously with receipt of the primary synchronization message or within a predetermined time interval of receipt of the first clock signal, at the network interface, from over the network, a backup synchronization message, the backup synchronization message received in addition to the primary synchronization message, the backup synchronization message received from a second device selected from the list of grandmaster clock devices and operable as a redundant primary source of time for all the devices in the network, the list of grandmaster clock devices being organized in order of priority based on at least clock traceability and device location within the network; and
    configuring a local clock, at the network device, based on both the primary synchronization message and the backup synchronization message being repeatedly received.

17. The method of claim 16, wherein the local clock at the network device is configured in response to receipt of each of the primary synchronization message and the backup synchronization message.

18. The method of claim 16, wherein,
    the local clock at the network device is configured to be substantially synchronous with a primary reference clock source of the primary grandmaster clock device based on the primary synchronization message and the backup synchronization message, wherein
    the primary synchronization message is generated at the primary grandmaster clock device according to the primary reference clock source; and
    the backup synchronization message is generated at the backup grandmaster clock device according to a local clock of the backup grandmaster clock device, wherein, the local clock of the backup grandmaster clock device is synchronized to the primary reference clock source based on the primary synchronization message.

19. The method of claim 18, wherein, in case of a failure to receive the primary synchronization message at the network device, the method further comprises:
- transitioning the local clock at the network device to be substantially synchronous with a secondary reference clock source of the backup grandmaster clock device based on the backup synchronization message, wherein,
- the backup synchronization message is generated at the backup grandmaster clock device according to the local clock of the backup grandmaster clock device,
- wherein the local clock of the backup grandmaster clock device is transitioned to be synchronous with the secondary reference clock, by changing the local clock by a predetermined tolerance value.

20. The method of claim 16, further comprising:
- identifying, at the network device, the backup grandmaster clock device as source of the backup synchronization message based on a clock identifier in the backup synchronization message;
- calculating, at the network device, difference between clock signals in successive backup synchronization messages;
- validating, at the network device, the backup grandmaster clock device based on the difference being within a predetermined range; and reporting, by the network device, the backup grandmaster clock device as an invalid clock source in response to the difference being outside the predetermined range.

* * * * *